March 31, 1959     I. NAXON     2,880,301
HEATING UNITS FOR ELECTRIC FRYING PANS AND THE LIKE
Filed Dec. 28, 1955
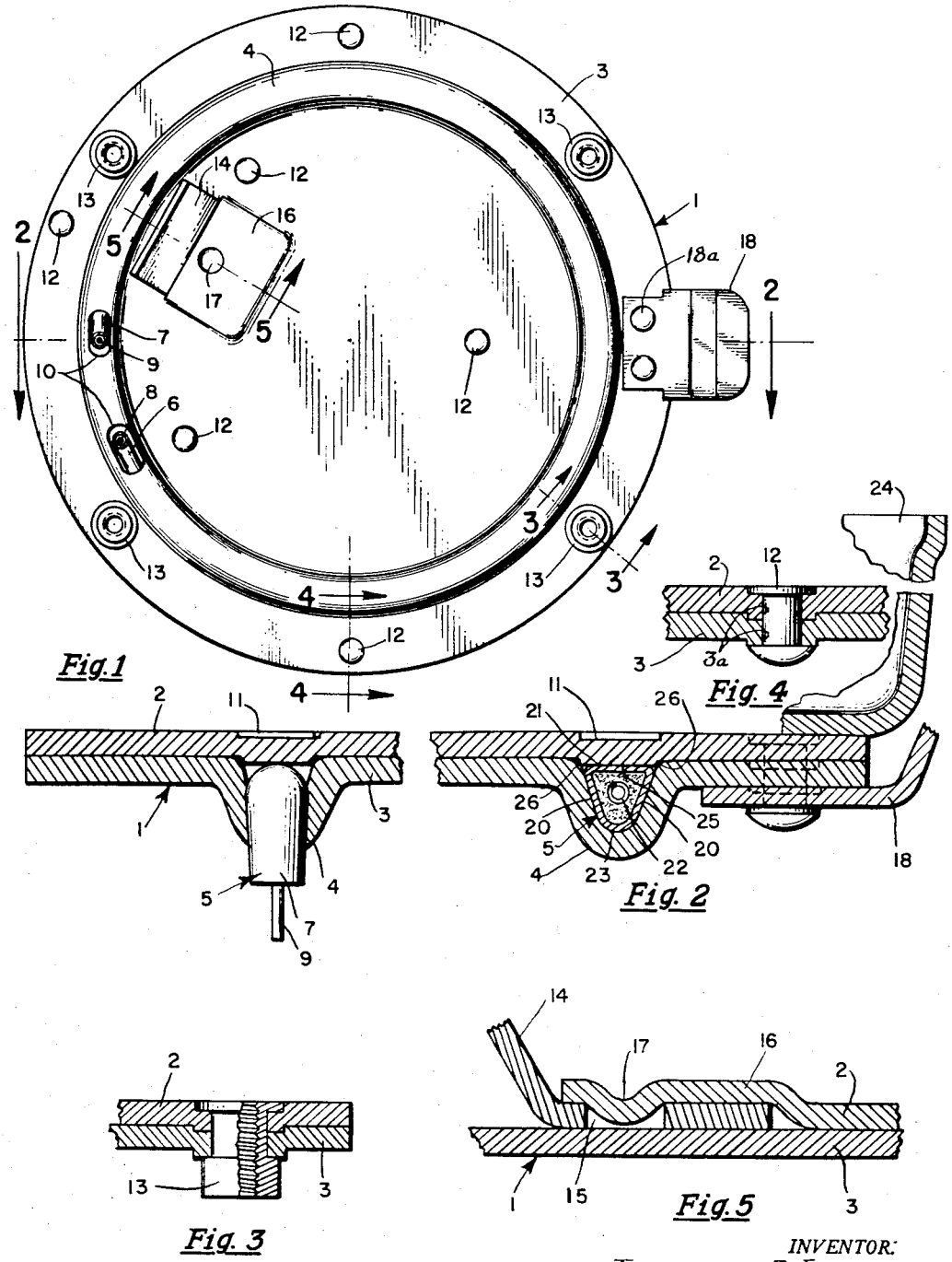
INVENTOR:
Irving Naxon
BY
Stevens & Batchelor
Attorneys

United States Patent Office 2,880,301
Patented Mar. 31, 1959

2,880,301

HEATING UNITS FOR ELECTRIC FRYING PANS AND THE LIKE

Irving Naxon, Chicago, Ill.

Application December 28, 1955, Serial No. 555,998

2 Claims. (Cl. 219—43)

My invention relates to electric frying pans of the type having a heating unit incorporated in the base of the pan, and more particularly to the frying pan covered in my Patent No. 2,798,931 issued July 9, 1957.

In the frying pan illustrated and described in the patent referred to a heating top of cast thermoconductive metal is employed and contains the electric heating element encased therein. In the patent, such heating element is indicated at 5, and Fig. 5 shows the manner in which it is encased. This construction is highly efficient, because all parts of the heating element surface are in complete contact with the metal of the heating top, so that the heat from the element is transmited and distribued in the heating top without accumulation in any zone contiguous to the metal of the heating top. If such were the case, such metal preferably being aluminum for purposes of lightness, the tendency would be for portions of the heating top affected by the excess heat to melt or become soft.

While the cast heating top has a high factor of efficiency when combined with the heating element for the reasons described, it is complicated and expensive to produce because of its special construction and adaptation to the heating element. For this reason, it is one object of the present improvement to depart from the use of a cast heating top by employing one of stamped construction with a novel adaptation to the heating element.

A further object is to design the improved heating top in the form of a pair of superimposed plates between which the heating element is lodged and so disposed as to gain the advantages of the cast plate construction at a lesser cost.

Another object is to employ one of the heating top plates as a receptacle for the heating element and the other as a cover for the same, using a construction which avoids the presence of air pockets or traps in which an excessive degree of heat could develop to affect the material encasing the heating element as stated.

Another object is to provide a novel method for forming and combining a heating element with a heating top in a manner to procure a high degree of thermal efficiency in respect to a vessel designed to be heated by said heating top.

Another object of my invention is to provide a method of adapting tubular heating elements to stamped sheet metal aluminum heating plates, and accomplish this object in a manner to prevent the temperature of the heating plates from reaching the flow point of aluminum, especially at the region adjacent the heating element. In this respect, in order to obtain the requisite amount of heat economically by way of a concentrated-wattage tubular heating element so employed in household appliances, it is desirable to keep the element small and compact. In so doing such a tubular heating element, when operated in free air at normally comfortable room temperatures, generally requires electrical energy in the neighborhood of 1000 watts or greater, and consequently burns at a dull or even bright-red heat which could induce the softening or melting of aluminum. Under such conditions, it is important that there exist a method of mechanically adapting the tubular heating element to the heating plate in a manner which will not only prevent the aluminum from reaching such dangerous temperatures, but to create a thermoconductive engagement which lowers the operating temperature of the tubular element itself, including the heating coil therein and consequently prolongs the life of the latter.

An additional object is to employ a standard heating element in principle and only alter the form thereof to suit the improved environment and gain the heat contact efficiency mentioned.

Another object is to effect a new method of manufacturing electric hot plates by preforming metal plates of high thermoconductive material, preforming a tubular heating element with a predetermined cross-section, placing the heating element in a recess corresponding to said cross-section made in one of said plates, and thereafter permanently trapping the heating element between the plates.

A still further object is to impart a novel form to one of the plates of the heating top, whereby a medium is provided which contributes to the heat contact feature, such medium also operating to distribute the heat which tends to concentrate in the portion of the heating top which follows the course of the heating element, so that a more uniform degree of heat is transmited to the frying pan.

An important object is to accomplish the above advantages by means of a structure which is assembled easily and without the need of special techniques or skills.

With the above objects in view, a better understanding of the invention may be had by reference to the accompanying drawing, in which:

Fig. 1 is a bottom view of the improved heating top; and

Figs. 2 to 5 are, respectively, enlarged sections on the lines 2—2, 3—3, 4—4, and 5—5 of Fig. 1, Fig. 2 being partly broken away in the intermediate region.

In accordance with the foregoing, specific reference to the drawing indicates the lower plate of the heating top at 1 and the upper plate at 2. These plates are of circular form and of stamped aluminum or other light and thermoconductive metal. As was previously stated, the heating element is designed for insertion between the plates of the heating top, following which the plates are fastened together. Thus, the rim portions 3 of the plates are formed with a series of circularly spaced apertures 3a for fastening elements to secure the plates together.

While the upper plate 2 is flat in a general sense, the lower one is pressed downwardly with an annular enlargement 4 which forms a well for the deposit of the heating element 5. Such heating element is usually formed with a shell of circular cross-section, a thermoconductive insulator, and a central heating coil. However, for the purpose of the present improvement, it is highly important that at least the shell 20 have a special form in order to accomplish the objects outlined. Thus, Fig. 2 shows clearly that the walls 20 of the shell are in V-formation, combining to form a part-circular bottom 23; and the top 21 of the shell is made flat.

The pressing of sheet or plate metal is far more efficient in forming curves than corners, so that it is practicable to press the enlargement 4 in a manner to form a well having the precise capacity and form of the shell walls 20 and 23, so that these walls may obtain a full contacting fit. It is also practicable to shape the shell of the heating element in the substantially triangular form to points constituting top corners between the top 21 and side walls 20 of the shell, this particularly because the shell is of a relatively thin metal. Thus, such spaces as may occur between the top 21 and the sides of the enlargement well would be so small as to be virtually negligible.

The stamping of the enlargement 4 creates rounded corners 26 at the top, and the application of a flat top to close the well, even if contact could be made with the top 21 of the heating element, still would leave spaces adjacent to the rounded corners 26. The upper plate 2 is therefore stamped with a circular recess 11 in the top over the region of the enlargement 4, such stamping creating a corresponding circular rib 25 which not only seats in full contacting relation with the heating element top 21, but fills in the spaces 26 in the top corners of the enlargement well. It is thus seen that the heating element 20 is now encased between the plates 2 and 3 to a substantially complete contacting extent, so that the heat of the heating element is conducted directly into the plates to be distributed therein, and finds no pockets or air traps in which to accumulate and rise to an excessive degree. At the same time, when the plates are secured together, the rib 25 of the upper plate 2 forms a strong and uniform clamp to pack the heating element in the well of the enlargement 4, so as to retain the heating element rigidly and in full contact with the walls of the well.

Figs. 1 and 2 show that the plate 1 is formed with elongated openings 10 for the outward passage of the terminal portions 7 of the heating element 20, such element having extended wires 9 for connection with the current supply facilities of the frying pan. Figs. 1 and 5 show that the upper plate 2 is also formed with a riser 16 defining a projection 17 which seats in an opening 15 made in the base of a bracket 14. Such bracket extends of the thermostat of the frying pan, which is not shown.

In assembling the plates 1 and 2, the apertures 3a are employed for the application of rivets 12, as shown in Fig. 4, in a number of places, such as shown in Fig. 1. However, at four corners rivets are employed which are extended with posts 13 which are tapped as shown in Fig. 3 to receive feet (not shown) from below, in order to support the pan on a table top or other flat surface.

When the plates 1 and 2 have been riveted fast, they may be considered in one piece for all intents and purposes. If the plate 2 has an even top surface, it is obvious that a greater amount of heat would be concentrated in the portion of the plate 2 which is over the heating element. Obviously, with a pan placed over the plate 2, the heat transmitted to the pan would not be uniform for the reasons stated, and the top recess 11 therefor has been provided to offset this deficiency. In other words, the recess forms a gap which checks the heat in the region of the heating element from reaching the pan or frying vessel directly. Thus, such heat necessarily finds an outlet by lateral distribution in the material of the plate 2, so that the heating influence on the pan is made more uniform.

The structure in my patent shows a retaining clip 37 carried by the pan-supporting structure, and a similar retaining clip is shown in the present improvement at 18, such clip being riveted to the plate 1, as indicated at 18a.

It will now be apparent that the improved frying pan makes it possible to use stamped metal plates for a heating top instead of a specially cast structure, and that the heating element need be only slightly modified in form to fit the assembly of plates as described. Thus, a considerable economy is gained in the production of the heating top, and the novel application of the heating element accomplishes a high degree of heating efficiency compatible with the stamped plate construction without prejudice to the environment of the heating element.

While I have described the invention along specific lines, various minor changes or refinements may be made therein without departing from its principle, and I reserve the right to employ all such changes and refinements as may come within the scope and spirit of the appended claims.

I claim:

1. In an electric cooking appliance, a heating top for a cooking vessel comprising a top plate joined in surface engagement with a bottom plate, both plates of highly thermoconductive material, the bottom plate stamped with an annular downward enlargement forming a well, and an electric heating element encased between the top plate and the walls of said well, the surface of the heating element making substantially complete thermoconductive contact with the contiguous surfaces of said top plate and well, wherein the stamping of the enlargement creates rounded corners at the top of the well and corresponding spaces between such corners and the top plate, and a projection from the latter filling said spaces.

2. In an electric cooking appliance, a heating top for a cooking vessel comprising a top plate joined in surface engagement with a bottom plate, both plates of highly thermoconductive material, the bottom plate stamped with an annular downward enlargement forming a well, and an electric heating element encased between the top plate and the walls of said well, the surface of the heating element making substantially complete thermoconductive contact with the contiguous surfaces of said top plate and well, wherein the stamping of the enlargement creates rounded corners at the top of the well and corresponding spaces between such corners and the top plate, the top surface of the heating element being flat, and an annular flat rib projecting from the bottom of the top plate to make said contact with the top heating surface, said rib being of a width to fill said spaces.

References Cited in the file of this patent

UNITED STATES PATENTS

| | | |
|---|---|---|
| 1,060,265 | Lamb | Apr. 29, 1913 |
| 1,063,526 | Fuller | June 3, 1913 |
| 1,432,950 | Bell | Oct. 24, 1922 |
| 1,737,498 | Hanes | Nov. 26, 1929 |
| 1,792,390 | Okamoto | Feb. 10, 1931 |
| 2,163,457 | Challet | June 20, 1939 |
| 2,428,899 | Wiegand | Oct. 14, 1947 |
| 2,443,806 | Shafter | June 22, 1948 |

FOREIGN PATENTS

| | | |
|---|---|---|
| 18,458 of 1908 | Great Britain | Nov. 12, 1908 |
| 243,784 | Great Britain | Nov. 30, 1925 |
| 501,181 | Great Britain | Feb. 22, 1939 |
| 119,540 | Australia | Feb. 6, 1945 |